(12) United States Patent
Königstein et al.

(10) Patent No.: US 12,397,581 B2
(45) Date of Patent: Aug. 26, 2025

(54) WHEEL HUB AND ASSOCIATED MOTOR VEHICLE

(71) Applicant: Dr. Ing. h.c. F. Porsche Aktiengesellschaft, Stuttgart (DE)

(72) Inventors: Patrick Königstein, Ditzingen (DE); Tobias Lörcher, Filderstadt (DE); Andreas Higle, Wendlingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 400 days.

(21) Appl. No.: 18/101,171

(22) Filed: Jan. 25, 2023

(65) Prior Publication Data
US 2023/0311568 A1    Oct. 5, 2023

(30) Foreign Application Priority Data
Apr. 4, 2022   (DE) ...................... 10 2022 108 029.3

(51) Int. Cl.
*B60B 3/16*     (2006.01)
*B60B 27/00*    (2006.01)
*B60B 27/06*    (2006.01)

(52) U.S. Cl.
CPC ............... *B60B 3/16* (2013.01); *B60B 27/00* (2013.01); *B60B 27/065* (2013.01); *B60B 2310/208* (2013.01); *B60B 2900/311* (2013.01)

(58) Field of Classification Search
CPC ....... B60B 3/16; B60B 27/00; B60B 27/0005; B60B 27/001; B60B 27/06; B60B 27/065; B60B 27/0047

USPC ....................................................... D12/207
See application file for complete search history.

(56) References Cited

U.S. PATENT DOCUMENTS

| | | | |
|---|---|---|---|
| 5,921,633 A * | 7/1999 | Neibling | B60B 27/0005 188/218 XL |
| 6,039,407 A * | 3/2000 | Wiacek | F16D 65/12 301/105.1 |
| 7,111,911 B2 | 9/2006 | Baumgartner et al. | |
| 7,631,948 B2 * | 12/2009 | Hofmann | B60B 27/00 301/105.1 |
| 7,871,134 B2 * | 1/2011 | Hofmann | B60B 27/0026 301/105.1 |

(Continued)

FOREIGN PATENT DOCUMENTS

| | | | |
|---|---|---|---|
| CN | 102107584 A * | 6/2011 | ......... B60B 27/0057 |
| CN | 108248283 A * | 7/2018 | |

(Continued)

*Primary Examiner* — Kip T Kotter
(74) *Attorney, Agent, or Firm* — Buchanan Ingersoll & Rooney PC

(57) ABSTRACT

A wheel hub for receiving a vehicle wheel, the wheel hub having a central region with a central opening. In order to achieve a reduction of the forces acting on wheel screws, it is provided that (i) the wheel hub includes at least four screw-in openings for screwing in a respective wheel screw; (ii) the wheel hub includes a number of stiffening ribs corresponding to the number of screw-in openings, which ribs extend obliquely or radially outward; (iii) in each case, two circumferentially adjacent stiffening ribs are connected to one another by a linearly extending connecting web, wherein the connecting web between the stiffening ribs has no connection to the central region; and (iv) a screw-in opening is arranged in each connecting web.

9 Claims, 2 Drawing Sheets

(56) References Cited

U.S. PATENT DOCUMENTS

| | | | |
|---|---|---|---|
| 11,446,957 B2 * | 9/2022 | Kraus | B60B 27/00 |
| 2008/0303339 A1 * | 12/2008 | Niebling | B60B 27/00 |
| | | | 301/106 |
| 2015/0015058 A1 * | 1/2015 | Perini | B60B 27/00 |
| | | | 301/105.1 |

FOREIGN PATENT DOCUMENTS

| | | | | |
|---|---|---|---|---|
| CN | 110696551 A * | 1/2020 | | B23P 15/00 |
| EP | 3293409 A1 * | 3/2018 | | F16D 65/123 |
| WO | WO-2012121245 A1 * | 9/2012 | | B21K 1/40 |
| WO | WO-2019015831 A1 * | 1/2019 | | B60B 27/0052 |

* cited by examiner

WHEEL HUB AND ASSOCIATED MOTOR VEHICLE

CROSS-REFERENCE TO RELATED APPLICATION

This application claims priority to German Patent Application No. 10 2022 108 029.3, filed Apr. 4, 2022, the content of such application being incorporated by reference herein in its entirety.

FIELD OF THE INVENTION

The present invention relates to a wheel hub for receiving a vehicle wheel, having a central region with a central opening. The invention further relates to a motor vehicle having such a wheel hub.

BACKGROUND OF THE INVENTION

A generic wheel hub for receiving a brake disk, in particular a wheel hub for commercial vehicles, is known from U.S. Pat. No. 7,111,911 B2, which is incorporated by reference herein, having a neck portion formed onto a wheel flange for receiving the brake disk, which, in an axial region next to the region for attaching the brake disk, is provided with a surface structure that is designed so as to amplify the heat output to the environment. In particular, a cooling of the wheel hub is meant to be improved by this.

Due to increasing vehicle weights, the loads acting on wheel hubs and wheel screws of such vehicles are also increasing. In order to ensure an equal and thus predictable deformation during driving maneuvers, an increased stiffness must be achieved with a higher vehicle weight. At the same time, the axial loads and torques in the wheel screws also increase. Conventional wheel hub designs with a continuous bolting flange reach their limits in view of the desire to keep a wheel screw load low and at the same time increase the stiffness with a low component weight.

The present invention therefore addresses the problem of providing an improved or at least alternative embodiment for a generic wheel hub, which is characterized in particular by a low weight, increased stiffness, and lower wheel screw load.

SUMMARY OF THE INVENTION

The present invention relates to the general idea of dividing the circumferentially continuous radially-outwardly projecting screw flange on a wheel hub into stiff and less stiff regions over the circumference and thereby obtaining a weight-optimized wheel hub, which is torsionally soft and otherwise comparatively stiff in the region of a wheel-screw connection. The wheel hub according to aspects of the invention for receiving a vehicle wheel has a central region with a central opening, in which, for example, a drive shaft engages in a known manner. According to aspects of the invention, the wheel hub now has four or five threaded bolts or screw-in openings, in particular typically at least four threaded bolts or screw-in openings, for screwing on a respective wheel nut or for screwing in a respective wheel screw. The wheel hub further comprises a number of stiffening ribs corresponding to the number of threaded bolts or screw-in openings, which ribs extend obliquely or radially outward from the central region. In each case, two circumferentially adjacent stiffening ribs are connected to one another via a connecting web, which extends linearly therebetween, wherein this connecting web between the individual stiffening ribs has no connection to the central region and can thus be configured in a torsionally soft manner. A threaded bolt or a screw-in opening is respectively arranged in each of the connecting webs. With the design according to aspects of the invention, it is possible to impart a comparatively high stiffness to the wheel hub due to the stiffening ribs and to mount the latter comparatively softly by means of the connecting webs extending between the individual stiffening ribs with the threaded bolts or the screw-in openings. A respective connecting web can also be used, in case of forces acting axially on the threaded bolts or screw-in openings, in the manner of a bending spring or leaf spring and thereby additionally help to minimize tensile forces on the threaded bolt or a wheel screw that is threaded into the respective screw-in opening. The comparatively thin configuration of the connecting webs can also keep all of the material required for the wheel hub low, which not only helps to conserve resources, but also enables the design of a weight-optimized wheel hub. With the possibility of the connecting web to rotate about its substantially circumferentially extending longitudinal axis, a certain rotatability or flexibility of the screw-in opening and thus of the wheel screw or the threaded screw rotated therein can be achieved, so that a comparatively torsionally soft connection can be achieved by the connecting web. This was not possible with previously used continuous collar-like screw flanges.

In an advantageous further development of the solution according to aspects of the invention, the connecting web is connected to a respective radially outer region of an associated stiffening rib. By pushing the respective connection web as far outward as possible, it becomes longer and thereby its torsional stiffness is reduced. Due to the reduced torsional stiffness, it is in turn possible to connect a wheel screw or a wheel nut to the wheel nut in a torsionally softer manner and thereby better absorb transverse forces and simultaneously reduce axial tensile forces acting on the wheel screw or alternatively on the threaded bolt.

In an advantageous further development of the solution according to aspects of the invention, the stiffening ribs are solidly formed. The stiffening ribs can optimally fulfill their stiffening function by the solid configuration of the stiffening ribs, wherein they can still be configured so as to be weight-optimized by a comparatively slender configuration of the individual stiffening ribs. Alternatively, a configuration of the respective stiffening ribs as one-sided open profiles, for example as U-profiles, is of course also conceivable, whereby additional weight savings can be achieved, which is of great interest in sports car construction, in particular.

In a further advantageous embodiment of the wheel hub according to aspects of the invention, an oval through-opening extends between each connecting web and the central region. Through this through-opening, the connecting web is decoupled from the central region and thereby allows for a torsion thereof, thereby allowing the torsionally soft connection according to aspects of the invention of the threaded bolt or the wheel screw screwed into the screw-in opening.

Expediently, the through-opening in the region of the central region and/or in the region of the threaded bolt or the screw-in opening comprises a concave recess. This makes it possible to form the connecting web outside of or adjacent to the threaded bolt or adjacent to the screw-in opening comparatively thin and thereby bendingly soft, which in turn provides load relief to the threaded bolts or wheel screws in relation to axial tensile forces, as well as a weight reduction.

The wheel hub is expediently made from forged metal and is reworked by rotational machining. In particular, with the described embodiment of the wheel hub according to aspects of the invention with stiffening ribs as well as connecting webs arranged therebetween with the screw-in openings and/or threaded bolts that are not connected to the central region of the wheel hub, it is enabled to have a shape favorable for a forging process as well as cost-effective reworking by rotational machining.

In a further advantageous embodiment of the wheel hub according to aspects of the invention, it is integrally formed. By forming the wheel hub according to aspects of the invention integrally, the production effort and thus also the production costs can be reduced, for example because separate parts are not required to be assembled. At the same time, this offers the great advantage that, by contrast to a constructed wheel hub, there are no gaps, which often favor corrosion.

In a further advantageous embodiment of the wheel hub according to aspects of the invention, it has an internal keying as well as an inwardly projecting flange. A play-free torque transmission between the drive shaft and the wheel hub and thus the vehicle wheel can be achieved via the internal keying, in which, for example, a complementary external keying of a drive shaft is engaged. A central screw can be easily screwed in from the outside via the inwardly projecting flange, which reduces the diameter of the central opening, but does not close it. The stiffness of the wheel hub can be increased by the inwardly projecting flange at a comparatively low weight, which is of great advantage in particular under high loads. The flange is also the support for the central screw to be screwed in.

The present invention is further based on the general idea of equipping a motor vehicle with a wheel hub described in the previous paragraphs, thereby transferring the advantages described in relation to the wheel hub to the motor vehicle. In specific terms, this means that a motor vehicle equipped with the wheel hubs according to aspects of the invention can be built more lightly, because the respective weight of the individual wheel hubs can be reduced without restricting their stiffness. With the torsionally soft connection of the screw-in openings or threaded bolts as attachments for a vehicle wheel, axial forces acting on the threaded bolts or wheel screws in driving operation can also be reduced, so that they can also be formed to be thinner, lighter, and also more cost-effective.

Further important features and advantages of the invention arise from the sub-claims, from the drawing, and from the accompanying description of the figures with reference to the drawing.

It goes without saying that the features mentioned above and those yet to be discussed below can be used not only in the respectively specified combination, but also in other combinations or on their own, without leaving the scope of the invention. The components described above and referred to below of a higher-level unit, e.g. a device, an apparatus, or an assembly, which are designated separately, can constitute separate components of this unit, or integral regions or sections of this unit, even if shown differently in the drawing.

BRIEF DESCRIPTION OF THE DRAWINGS

Preferred embodiment examples of the invention are set forth in the drawing and will be explained in further detail in the description below, wherein identical reference numbers refer to identical, similar, or functionally identical components.

The following are shown schematically.

DETAILED DESCRIPTION OF THE INVENTION

Figure 1:
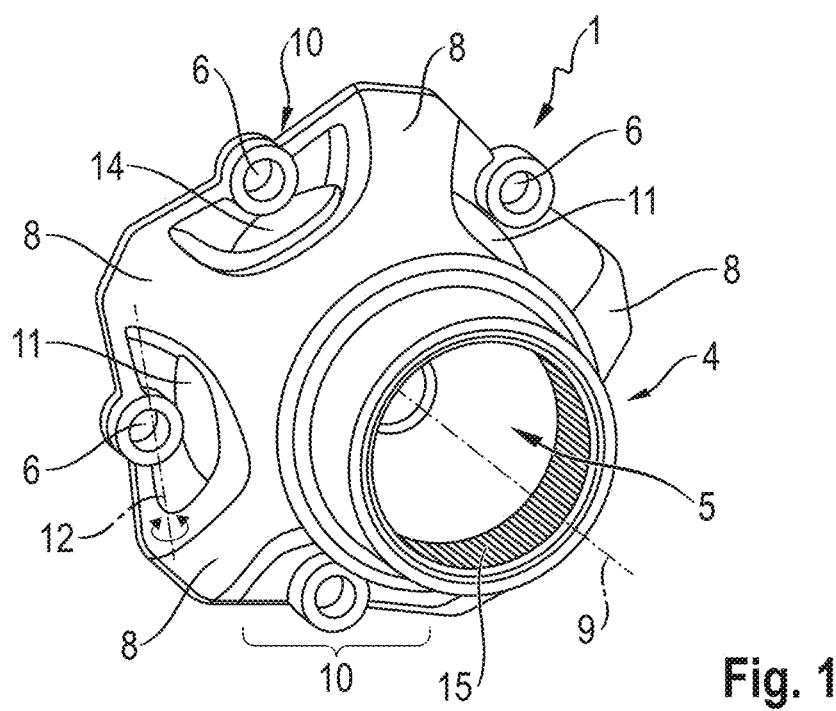
FIG. 1 is a top view of a wheel hub according to aspects of the invention.
Figure 2:
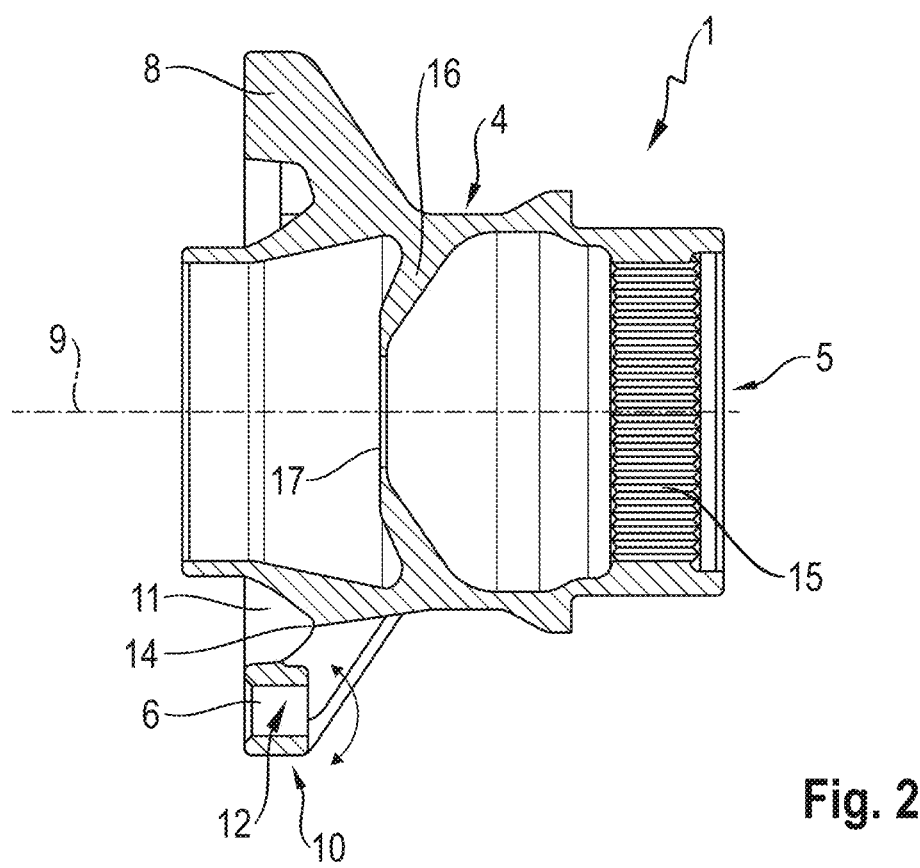
FIG. 2 is a sectional view through a wheel hub according to aspects of the invention.
Figure 3:
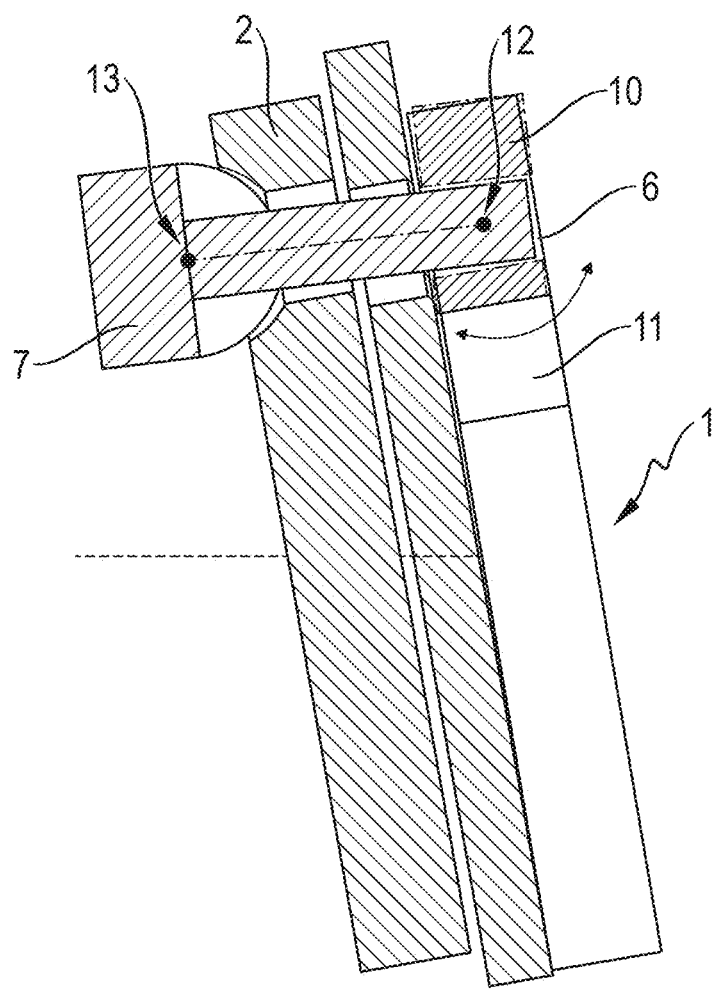
FIG. 3 is a sectional view through a motor vehicle according to aspects of the invention in the region of a wheel hub according to aspects of the invention.

According to FIGS. 1 to 3, a wheel hub 1 according to aspects of the invention for receiving a vehicle wheel 2 (cf. FIG. 3) on a motor vehicle according to aspects of the invention comprises a central region 4 having a central opening 5. The wheel hub 1 has at least four threaded bolts (not shown) or screw-in openings 6 for screwing on a wheel nut or for screwing in a wheel screw 7 (cf. FIG. 3). According to FIGS. 1 to 3, a wheel hub 1 having only screw-in openings 6 is shown, wherein threaded bolts could also be provided in place of the screw-in openings 6. In addition, the wheel hub 1 according to aspects of the invention has at least four, in the present case a total of five, stiffening ribs 8, which extend angularly or radially from the central region in relation to an axis 9. The axis 9 simultaneously represents the axis of rotation of the wheel hub 1 in the operation of the motor vehicle. In each case, two circumferentially adjacent stiffening ribs 8 are connected via a connecting web 10, which extends linearly or substantially linearly therebetween, wherein the connecting web 10 between the individual stiffening ribs 8 has no connection to the central region 4, but rather a through-opening 11 is arranged therein. In each of these connecting webs 10, either a threaded bolt or a screw-in opening 6 is arranged. According to FIGS. 1 to 3, a respective screw-in opening 6 is provided, namely substantially centrally to the two adjacent stiffening ribs 8.

The wheel hub 1 configured in this way offers the great advantage that the screw-in openings 6 in the connecting webs 10 are attached to the wheel hub 1 in a torsionally soft manner, in particular significantly softer than if they were to be arranged in a radially outwardly projecting and continuous flange as known in the prior art. By arranging the respective screw-in openings 6 in the comparatively thinly formed connecting webs 10, these allow for a rotation about a longitudinal axis 12 of the connecting webs 10, wherein such a longitudinal axis 12 according to FIG. 2 runs orthogonally to the sheet plane, for example.

This allows in the wheel hub 1 according to aspects of the invention that the individual screw-in openings 6 can rotate with higher transverse loads occurring during travel operation about the longitudinal axis 12 (cf. FIG. 3) without introducing higher bending torques into a shaft of the wheel screw 7. If the wheel screws 7 additionally have a screw head that is rounded in relation to the vehicle wheel 2, as shown in FIG. 3, then the wheel screw 7 can be twisted about the longitudinal axis 12 on the one hand and about the axis 13, which also extends orthogonally to the blade plane according to FIG. 3, on the other hand, wherein the two axes 12, 13 run parallel to one another. This not only allows the torques or transverse forces acting on the wheel screw 7 to be reduced, but also the axial forces acting on the wheel screw 7, because the comparatively torsional-soft connection of the screw-in opening 6 at the connecting web 10 also allows for an axially compliant configuration of the screw-in opening 6 together with the connecting web 10, because the connecting web 10 in this case acts in the manner of a leaf spring.

If one considers FIG. 1 again, it can be seen that the through-opening 11 in the region of the central region 4 and the screw-in opening 6 comprises a concave recess 14, which allows an even thinner configuration of the connecting web 10 and thus a torsionally softer or axially more compliant connection of the screw-in opening 6 to the wheel hub 1.

The wheel hub 1 can be generally made of forged metal and can be reworked by rotational machining. In this case, the wheel hub 1 is preferably integrally formed, which in particular makes installation unnecessary. This allows the wheel hub 1 to be formed in an overall cost-effective and at the same time also more corrosion-resistant manner, because gaps are created, especially in case of constructed wheel hubs, which favor a corrosion risk of ingress of water due to capillary forces.

If one considers the sectional view in FIG. 2, it can be seen that the stiffening rib 8 shown therein is solidly formed, whereby its stiffening function is comparatively high at a comparatively low weight. Alternatively, it is of course also conceivable that the individual stiffening ribs are formed in single-sided open profiles, for example cross-sectional U-profiles, whereby a comparatively high stiffness can be achieved with an even further reduced weight.

If one considers FIGS. 1 and 2 further, one can recognize that the wheel hub 1 also has an internal keying 15, via which a drive shaft (not shown) can be connected to the wheel hub 1 in a rotationally fixed manner. Also provided is an inwardly projecting flange 16 (cf. FIG. 2), which allows for a further increase in the stiffness of the wheel hub 1.

A central screw (not shown) can be inserted through the opening 17 formed by the flange 16 and screwed to the drive shaft, wherein this central screw supports itself with its head on the flange 16.

All in all, with the motor vehicle according to aspects of the invention and its wheel hubs 1 according to aspects of the invention, a significant load relief of the wheel screws 7 can be achieved, because the screw-in openings 6 are configured so as to be torsionally softer and also softer in the axial direction. The connection webs 10 also operate as a leaf spring due to their thin design and longitudinally end-sided connection to the stiffening ribs 8. The wheel hubs 1 according to aspects of the invention are also comparatively stiff and nevertheless weight-optimized.

What is claimed is:

1. A wheel hub for receiving a vehicle wheel, said wheel hub comprising:
   a wheel hub body,
   a central region formed in the body with a central opening,
   either at least four threaded bolts on the body for screwing on a respective wheel nut or at least four screw-in openings disposed on the body for receiving a respective wheel screw,
   a number of stiffening ribs corresponding to the number of threaded bolts or screw-in openings, which stiffening ribs extend obliquely or radially outward on the body from the central region,
   wherein two circumferentially adjacent stiffening ribs of said number of stiffening ribs are connected to one another by a linearly extending connecting web, wherein the connecting web between the stiffening ribs has no connection to the central region,
   wherein, either one of the threaded bolts or one of the screw-in openings is arranged in the connecting web.

2. The wheel hub according to claim 1, wherein the connecting web is connected to a radially outer region of an associated stiffening rib of said number of stiffening ribs.

3. The wheel hub according to claim 1, wherein the stiffening ribs are solidly formed.

4. The wheel hub according to claim 1, wherein an oval through-opening extends between each connecting web and the central region.

5. The wheel hub according to claim 4, wherein the through-opening in the region of the central region and the threaded bolt or the screw-in opening comprises a concave recess.

6. The wheel hub according to claim 1, wherein the wheel hub is composed of forged metal.

7. The wheel hub according to claim 1, wherein the wheel hub is integrally formed.

8. The wheel hub according to claim 1, wherein the wheel hub comprises an internal keying and an inwardly projecting flange.

9. A motor vehicle having the wheel hub according to claim 1.

* * * * *